(No Model.)
J. CALDWELL.
COMPOUND TOOL.
No. 445,972. Patented Feb. 10, 1891.
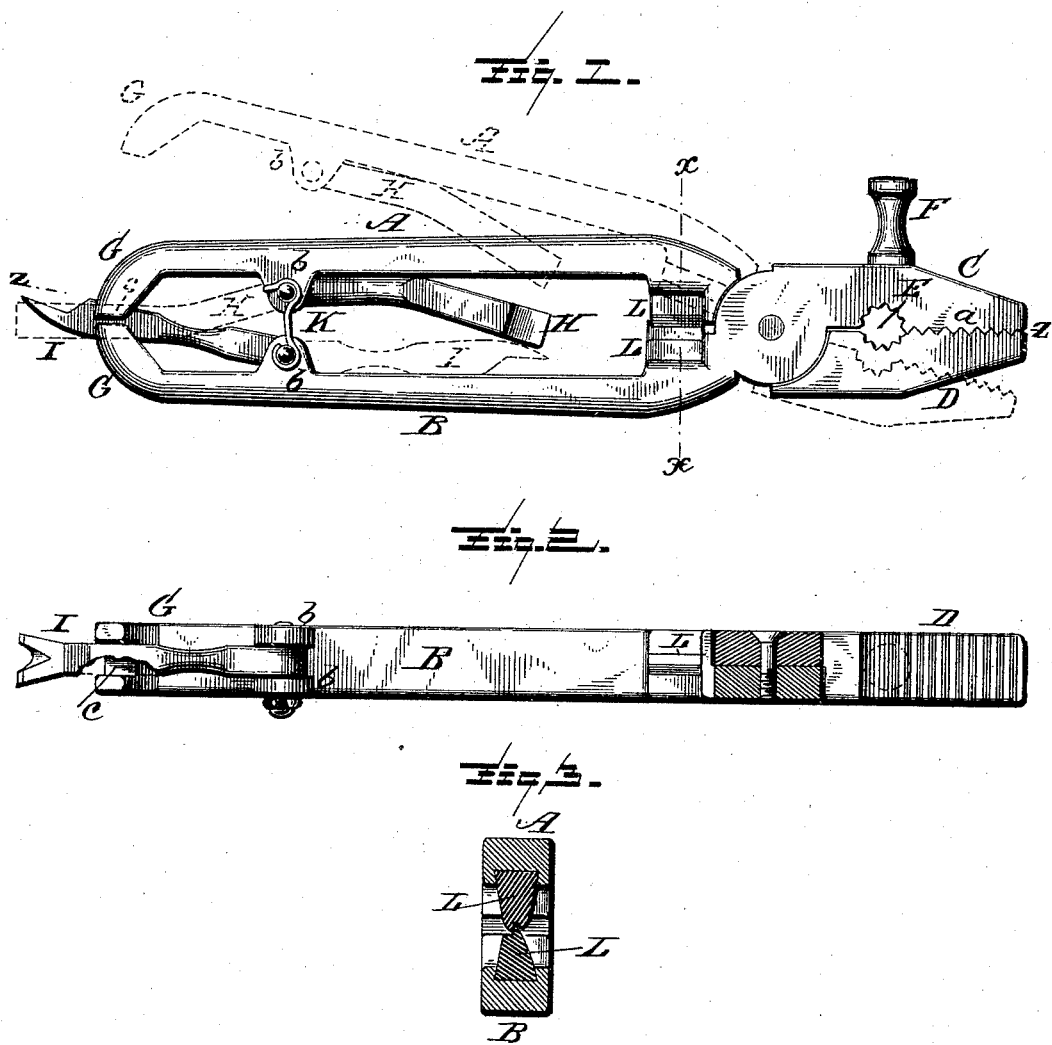

UNITED STATES PATENT OFFICE.

JOHN CALDWELL, OF BELOIT, WISCONSIN, ASSIGNOR OF ONE-HALF TO JOHN FOSTER, OF SAME PLACE.

COMPOUND TOOL.

SPECIFICATION forming part of Letters Patent No. 445,972, dated February 10, 1891.

Application filed February 26, 1890. Serial No. 341,899. (No model.)

*To all whom it may concern:*

Be it known that I, JOHN CALDWELL, a citizen of the United States, residing at Beloit, in the county of Rock and State of Wisconsin, have invented a certain new and useful Improvement in Compound Tools; and I do hereby declare that the following is a full, clear, and exact description of the same, reference being had to the annexed drawings, making a part of this specification, and to the letters of reference marked thereon.

Figure 1 of the drawings represents a side elevation of my improved compound tool; Fig. 2, a longitudinal section thereof, taken on line $z\ z$ of Fig. 1; Fig. 3, a cross-section taken on line $x\ x$ of Fig. 1.

The present invention has for its object to provide a simple device that will combine several tools convenient for use in the household, the several tools being combined in small compass, and all conveniently connected together, so that a part of one will form a part of another, and each tool especially adapted for a particular purpose, and readily accessible, when required, for household or mechanical purposes. These several objects I attain by a compound tool constructed substantially as shown in the drawings, and hereinafter described and claimed.

In the accompanying drawings, A B represent the handles of the tool, and C D the jaws of the pinchers, pivoted or hinged together in the ordinary manner, said jaws having serrated faces, as shown at $a$, and a serrated opening E, which enables the jaws to be used as a pipe-wrench, one of the jaws having a hammer-head F, which may be cast therewith or formed separate and connected thereto in any suitable and well-known manner.

The handles A B at their extremities are curved inwardly, as shown, to form holding-jaws G, and are of sufficient length to come in contact with each other, or nearly so, when the handles are closed. Upon the inner sides of the handles are lugs $b$, and to these lugs are pivoted the screw-driver H and tack-puller I, respectively, so that each tool may be brought into position for use independent of the other and securely held between the jaws G.

In the drawings, Fig. 1, the screw-driver is shown extended and ready for use in dotted lines, and in full lines is shown turned back out of the way when not required for use, and the tack-puller is shown in full lines in an extended position and closed in dotted lines, thereby showing the two positions the tools will assume.

Previous to adjusting these tools as above described it is necessary that one of the handles should be opened or extended laterally, as shown in Fig. 1, dotted lines, after which the tool may be swung around in position for use, said tool resting in a recess $c$ in one of the jaws G. The opposite handle is now closed and the recess $c$ of the jaw G thereof brought down over the tool, as shown in Fig. 1, the tool thus being held between the two jaws G of the handles A B with a vise-like grasp, the recesses $c$ in the holding-jaws preventing the tool from moving sidewise or laterally.

The handles A B are held in a closed position by any suitable fastening device, one of many forms I have shown at K, which consists of a hook pivoted to one of the lugs of the handle and engaging a headed pin on the other lug.

Immediately in the rear of the jaws C D are steel cutting-blades L, removably connected thereto in any suitable and well-known manner to admit of their being sharpened or renewed, when required, the purpose of which is to cut wire when placed between them.

Having now fully described my invention, what I claim as new, and desire to secure by Letters Patent, is—

A compound tool consisting of the handles A B, terminating at one end with jaws C D, having serrated opening E, to serve as a pipe-wrench, and the hammer-head F upon one of said jaws, and the opposite ends of the handles terminated in recessed holding-jaws G, the tools H I, pivoted to the handles, the cutting-blades L thereon, and suitable means for holding the handles closed, substantially as and for the purpose set forth.

JOHN CALDWELL.

Witnesses:
M. W. ARRIES,
O. H. ORTON.